(12) United States Patent
Dubé et al.

(10) Patent No.: US 7,535,851 B2
(45) Date of Patent: May 19, 2009

(54) DISCOVERING DIAGNOSTIC PORT FUNCTIONALITY IN A DISTRIBUTED SYSTEM

(75) Inventors: Jean-François Dubé, Santa Clara, CA (US); George Anthony Bullis, Glendora, CA (US); Kenneth R. Hornyak, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 734 days.

(21) Appl. No.: 10/926,113

(22) Filed: Aug. 25, 2004

(65) Prior Publication Data

US 2005/0047339 A1 Mar. 3, 2005

Related U.S. Application Data

(60) Provisional application No. 60/498,140, filed on Aug. 26, 2003.

(51) Int. Cl.
*H04L 12/26* (2006.01)
*G06F 15/177* (2006.01)
(52) U.S. Cl. .................. 370/252; 370/254; 709/220
(58) Field of Classification Search ......... 370/229–232, 370/235, 236, 241, 241.1, 246–252, 254; 709/220, 221, 223, 224, 227
See application file for complete search history.

(56) References Cited

U.S. PATENT DOCUMENTS

| 5,838,907 | A | * | 11/1998 | Hansen ................... 709/220 |
| 6,286,038 | B1 | * | 9/2001 | Reichmeyer et al. ........ 709/220 |
| 2003/0061312 | A1 | * | 3/2003 | Bodner et al. ............... 709/220 |
| 2005/0021715 | A1 | * | 1/2005 | Dugatkin et al. ............ 709/223 |
| 2005/0060402 | A1 | * | 3/2005 | Oyadomari et al. ......... 709/224 |
| 2005/0060413 | A1 | * | 3/2005 | Oyadomari et al. ......... 709/227 |

OTHER PUBLICATIONS

U.S. Appl. No. 10/925,492, filed Aug. 25, 2004, Dube et al.

* cited by examiner

*Primary Examiner*—Aung S Moe
*Assistant Examiner*—Kerri M Rose
(74) *Attorney, Agent, or Firm*—Workman Nydegger

(57) ABSTRACT

The present invention provides for discovering diagnostic port functionality in a distributed system. A computer system requests network addresses for one or more chassis. A chassis receives the request for a network address and returns a corresponding network address at least for the chassis. The computer system receives one or more network addresses corresponding to the one or more chassis. The computer system requests resource data from each of the one or more corresponding network addresses. The chassis receives the request for resource data and returns resource data representing at least the current configuration of the chassis to the requesting computer system. The computer system receives resource data representing the configuration of the one or more chassis. The computer system presents the received resource data at the requesting computer system.

38 Claims, 10 Drawing Sheets

DISCOVERING DIAGNOSTIC PORT FUNCTIONALITY IN A DISTRIBUTED SYSTEM

CROSS REFERENCE TO RELATED APPLICATIONS

The present application claims priority to U.S. Provisional Patent Application Ser. No. 60/498,140 entitled "Discovering Diagnostic Port Functionality In A Distributed System" filed Aug. 26, 2003, which is hereby incorporated by reference.

BACKGROUND OF THE INVENTION

1. The Field of the Invention

The present invention relates generally to data transmission systems and components. More particularly, embodiments of the present invention relate to discovering diagnostic port functionality in a distributed system.

2. Background and Relevant Art

Computer and data communications networks continue to proliferate due to declining costs, increasing performance of computer and networking equipment, and increasing demand for communication bandwidth. Communications networks—including wide area networks ("WANs"), local area networks ("LANs"), and storage area networks ("SANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

Consequently, as high speed data communications systems, processes and devices mature, many designs have increasingly focused on reliability and performance issues. Accordingly, a number of diagnostic devices and tests can be utilized to aid a network administrator in both identifying existing network conditions that are causing a network to deviate from expected performance and proactively identifying network conditions that may cause a network to deviate from expected performance in the future.

One device that is used to identifying network conditions is a protocol analyzer, also called a network analyzer. Generally, a protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks.

A protocol analyzer operates by capturing selected portions of data from a data stream that is transmitted via the communications network. The captured information may then be analyzed in greater detail by the protocol analyzer to extract desired information. For example, data transmission faults or errors, or performance errors, known generally as problem conditions, may be diagnosed by examining the captured data that is related to the problem.

Another device that is used to identify network conditions is a generator. Generally, generators generate network traffic to simulate various network conditions. For example, a generator can generate network traffic that simulates a data stream between two nodes on a network. The behavior of the two nodes, as well as other nodes of the network, can be evaluated to determine how the network responds to the simulated data stream. Thus, a network administrator may be able to identify performance deviations and take appropriate measures to prevent the performance deviations from occurring in the future.

Another device that is used to identify network conditions is a bit error rate tester. Generally, bit error rate testers operate by transmitting a predetermined bit sequence onto the data transmission path, and then analyze the predetermined bit sequence when it returns to the bit error rate tester. Typically, such analyses involve comparing the received bit sequence to a copy of the bit sequence that was initially transmitted onto the data transmission path. This comparison permits errors within the sequence to be identified and counted. After the errors in the bit sequence are counted, that information is used to calculate an overall bit error rate. If the bit error rate is too high, the data transmission path and its physical layer should be inspected. Some protocol's specifications expect the bit error rate to be less than a specific value.

Another device that is used to identify network conditions is a jammer. Generally, jammers provide the ability to selectively alter channel data, including the introduction of errors into channel data paths. Thus, jammers permit monitoring of the response of the communications system to the altered data, and help determine whether the communications system is capable of responding without experiencing adverse effects in performance such as loss of data or network traffic interruption. For example, a network system designer can perform any one of a number of different diagnostic tests to make determinations such as whether a system responded appropriately to incomplete, misplaced or missing tasks or sequences, how misdirected or confusing frames are treated, and how misplaced ordered sets are treated.

Protocol analyzers, generators, bit error rate testers, and jammers (and possibly other devices that test for network conditions) can be implemented on printed circuit boards (often referred to as "cards" or "blades") that are inserted into a computer system test chassis. Depending on the desired functionality, an administrator can insert a particular type of card into a computer system test chassis. For example, when an administrator desires to test a bit error rate for a network, the administrator can insert a bit error rate tester card into a computer system test chassis. Subsequently, when the administrator desires to analyze network traffic, the administrator can remove the bit error rate test card from the computer system test chassis and insert a network analyzer card into the computer system test chassis.

Some computer system test chassis even include multiple card receptacles such that the computer system test chassis can receive a number of cards. Thus, an administrator may have some flexibility to simultaneously test a network for a variety of network conditions. For example, an administrator may include a generator card and a jammer card in a multi-receptacle computer system test chassis to simultaneously utilize both generator and jammer functionality. Unfortunately, as a network expands and/or is reconfigured, the requirements for testing the network can change. Expansion and/or reconfiguration of a network can result in an administrator having to, at least from time-to-time, reconfiguring the network testing functionality for a network.

Since testing functionality can be spread access different sub-nets (e.g., separate by routers) an administrator may be required to have a client program on each sub-net to access circuit boards that implement testing functionality within each sub-net. This can be time consuming as different sub-nets may be located in different geographic locations (possible separated large distances) and an administrator may be required to access the client program to identifying current testing functionality. Further, if the testing functionality on a multi-receptacle computer system test chassis changes on a remote sub-net (due to user reconfiguration), it may be difficult for an administrator to even become aware that testing functionality has changed. Therefore systems, methods, and computer program products for discovering diagnostic port functionality in a distributed system would be advantageous.

BRIEF SUMMARY OF THE INVENTION

The foregoing problems with the prior state of the art are overcome by the principles of the present invention, which are directed towards methods, systems, and computer program products for discovering diagnostic port functionality in a distributed system. A computer system is network connectable to one or more chassis that each contains one or more network diagnostic modules. The computer system requests network addresses for one or more chassis. A chassis receives the request for a networks address and returns a corresponding network address at least for the chassis. The computer system receives one or more network addresses corresponding to the one or more chassis.

The computer system requests resource data from each of the one or more corresponding network addresses. The chassis receives the request for resource data and returns resource data representing at least the current configuration of the chassis to the requesting computer system. The computer system receives resource data representing the configuration of the one or more chassis. The computer system presents the received resource data at the requesting computer system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
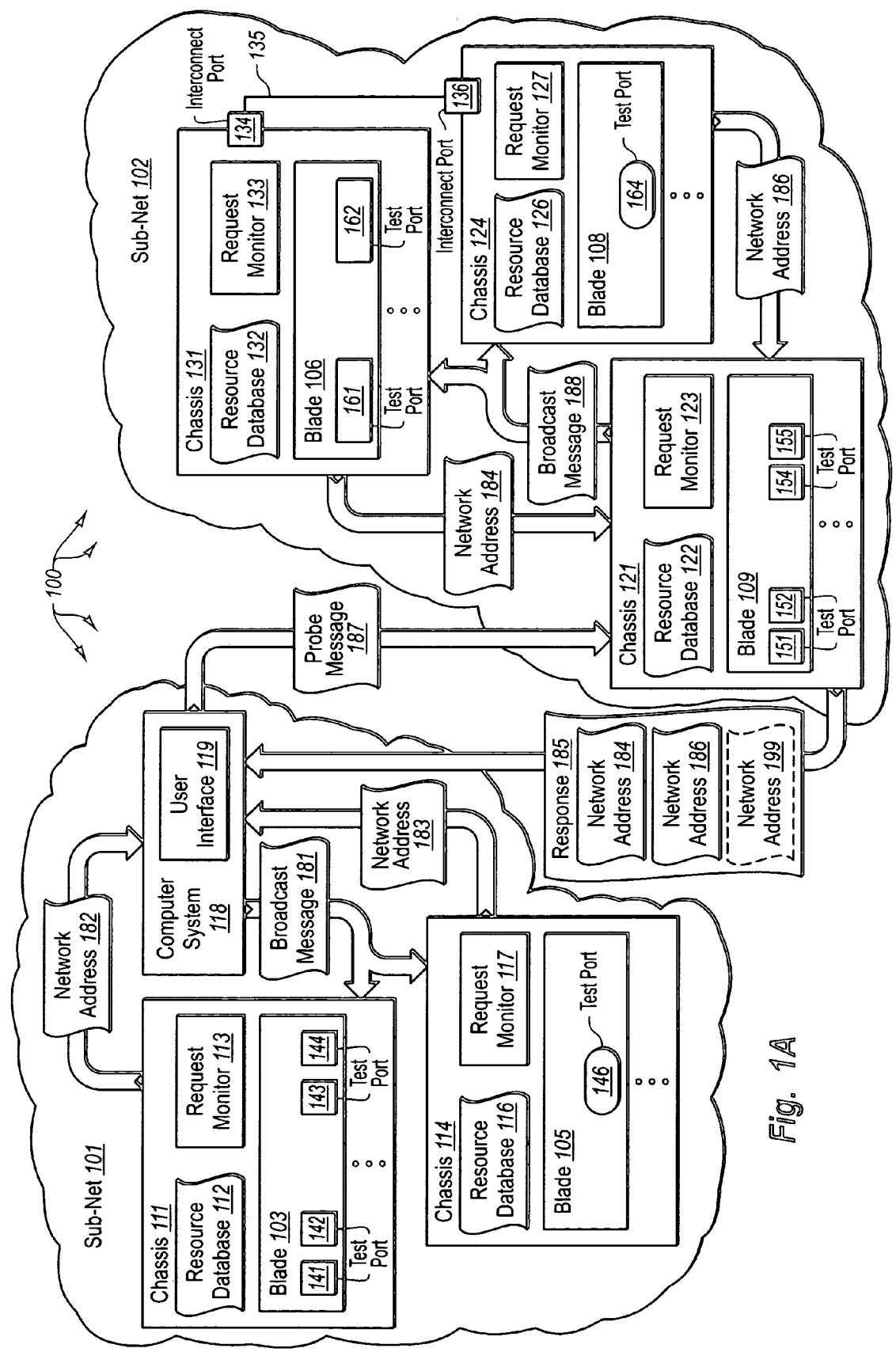
FIG. 1A illustrates an example of network architecture and associated modules and data structures for discovering chassis that contain network diagnostic modules in accordance with the principles of the present invention.

The principles of the present invention provide for discovering diagnostic port functionality in a distributed system. A computer system is network connectable to one or more chassis that each contains one or more network diagnostic modules. The computer system requests network addresses for one or more chassis. A chassis receives the request for a networks address and returns a corresponding network address at least for the chassis. The computer system receives one or more network addresses corresponding to the one or more chassis.

The computer system requests resource data from each of the one or more corresponding network addresses. The chassis receives the request for resource data and returns resource data representing at least the current configuration of the chassis to the requesting computer system. The computer system receives resource data representing the configuration of the one or more chassis. The computer system presents the received resource data at the requesting computer system.

Network diagnostic modules include one or more programmable logic modules (e.g., one or more Field Programmable Gate Arrays ("FPGAs")) that include circuitry for implementing any of a plurality of different network diagnostic functions (e.g., network analyzer, jammer, generator, bit rate error test, etc). Each programmable logic module controls one or more test ports that provide interfaces for different physical configurations (e.g., Gigabit Ethernet, Fibre Channel, Serial Attached SCSI ("SAS"), Serial ATA ("SATA"), etc.) and that can interoperate with the programmable logic module to implement a selected network diagnostic function. In some embodiments, a network diagnostic module is included in a printed circuit board (hereinafter referred to as a "card" or "blade") that is inserted into an appropriate receptacle at a chassis (e.g., using a Peripheral Component Interconnect ("PCI") interface). Accordingly, the network diagnostic module may exchange data through electrical contacts of the receptacle.

Generally, a network diagnostic module receives a bit file with instructions for implementing a selected diagnostic function at one or more test ports that interface with a network. A bit file contains programming data to program a programmable logic module (e.g., an FPGA) to have a specific function. A bit file can be received from a mass storage device or even from a memory location at the computer system. Programming data can include computer-executable instructions, computer-interpretable instructions, or circuit design data (for a programmable logic module) that is processed by the network diagnostic module to implement the selected network diagnostic function. The network diagnostic module identifies a programmable logic module (e.g., an FPGA) that controls the one or more test ports. The network diagnostic module loads the programming data at the identified programmable logic module to cause the programmable logic module and the one or more test ports to interoperate to implement the selected diagnostic function. Accordingly, programming data contained in a bit file can be loaded at an FPGA to cause the FPGA to implement any of a network analyzer, jammer, bit error rate tester, generator, etc. When a new implementation is desired (e.g., changing from a jammer to a bit error rate tester) programming data from a new bit file can be loaded.

It may be that a network diagnostic function is part of a "port personality" represented in a bit file. For example, a port personality can include a network diagnostic function, a clock rate (e.g., 1.065, 2.125, or 2.5 Gigabits per second), and a protocol (e.g., Fibre Channel, Gigabit Ethernet, Infiniband, etc). Thus, a programmable logic module can process programming data (e.g., computer-executable or computer-interpretable instructions or circuit design data) to cause a programmable logic module and a corresponding test port or test ports to interoperate to implement a port personality in accordance with the processed programming data. For example, a programmable logic module can process instructions from a bit file to cause the programmable logic module and corresponding test ports to interoperate to implement a Fibre Channel jammer (i.e., a real-time error injector) at 2.125 Gbps. Accordingly, the personality of the corresponding test ports can include implementation of a particular network diagnostic function.

In some embodiments, a number of network diagnostic modules are included in a common chassis computer system. Thus, chassis with increased numbers of flexibly configurable test ports can be utilized to test a network. A chassis can include a mass storage interface for transferring network diagnostic data to and/or from a mass storage device, a trigger port for detecting the occurrence of events, an interconnect port for connecting to other chassis, and a remote access port for receiving commands from remote computer systems. Connected chassis can exchange control signals over links between corresponding interconnect ports. Accordingly, network diagnostic modules at a number of different chassis can be controlled from any of the other chassis. Connecting a number of chassis together can further increase the number of test ports that are utilizable to test a network.

FIG. 1A illustrates an example of network architecture 100 and associated modules and data structures for discovering chassis that contain network diagnostic modules in accordance with the principles of the present invention. FIG. 1A depicts computer system 118 that is network connectable to chassis 111, 114, 121, 124, and 131. Computer system 118 includes user interface 119 that can discover and present chassis, blade, and port information to a user at computer system 118. User interface 119 can be configured to query for chassis network addressing information (e.g., Internet Protocol ("IP") addresses) and to query for resource data maintained at chassis. User interface 119 can present network addressing information and resource data returned in response to queries.

Each of chassis 111, 114, 121, 124, and 131 can be chassis computer systems that contain one or more blades. Within network architecture 100, each chassis is expressly depicted as including one blade. A sequence of three vertical periods (i.e., a vertical ellipsis) at each chassis represents that each chassis can include one or more additional blades. Each blade can include one or more programmable logic modules that are currently interoperating with one or more test ports to implement network diagnostic functions. For example, a programmable logic module of blade 103 can be interoperating with test ports 141 and 142 to implement a Fibre Channel analyzer.

Chassis Discovery

Each of chassis 111, 114, 121, 124, and 131 can have a request monitor that listens for broadcast messages and probe messages and, in response to a received broadcast message or a received probe message, returns network address information to a requesting computer system. A request monitor can be configured to listen for broadcast and/or probe messages on an assigned port. For example, request monitor 117 can be configured to listen for broadcast and/or probe messages at UDP port 2000.

Correspondingly, a requesting computer system can send broadcast and/or probe messages to the assigned port. For example, computer system 118 can be configured to send broadcast and/or probe messages to UDP port 2000. Broadcast and probe messages can be sent in accordance with virtually any protocol. For example, computer system 118 can send broadcast message 181 in accordance with the UDP protocol. Accordingly, in response to a broadcast or probe message, a chassis can return address information (e.g., an IP address). For example, in response to broadcast message 181 chassis, chassis 114 can send network address 183 to computer system 118.

In some embodiments, a chassis in one sub-net acts as a proxy for a requesting computer system in another sub-net. For example, computer system 118 (in sub-net 101) can send probe message 187 to chassis 121 (in sub-net 102). Computer system 118 may have prior knowledge of a network address (e.g., an IP address) corresponding to chassis 121. In response to probe message 187, chassis 121 can send broadcast message 188. Accordingly, other chassis in sub-net 102 can respond with network address information. For example, chassis 131 can send network address 184 to chassis 121 and chassis 124 can send network address 186 to chassis 121.

Chassis 121 can include received network address information in a response that is returned to computer system 118. For example, chassis 121 can send response 185, which includes network addresses 184 and 186, to computer system 118. Optionally, chassis 121 can also include network address information, such as, for example, network address 184, corresponding to chassis 121. Alternately, in response to broadcast message 188, chassis 131 and 124 can respond to computer system 118 directly. Accordingly, a requesting computer system can discover network address information, such as, for example, IP addresses, for chassis in the same and/or different sub-nets.

Figure 6:
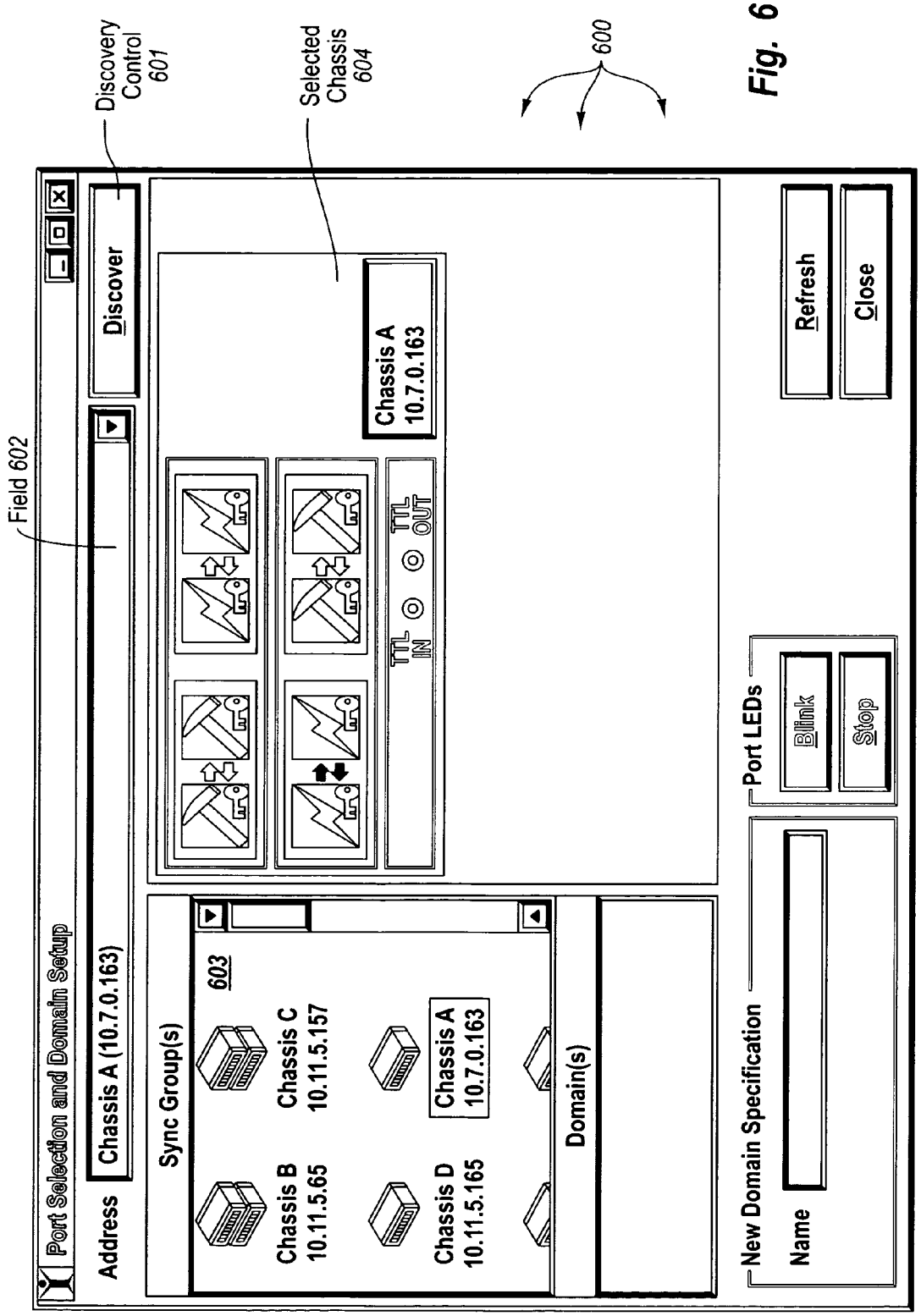
FIG. 6 illustrates an example user-interface screen for presenting discovered chassis and resources.

Discovered address information can be presented at a requesting computer system. For example, user interface 119 can present addressing information for chassis 111, 114, 121, 124 and/or 131 at computer system 118. FIG. 6 illustrates an example user-interface screen 600 for presenting discovered chassis and resources. It may be that user interface 119 presents user-interface screen 600 at computer system 118.

User-interface screen 600 includes discovery control 601. A user or technician can select discovery control 601 to, for example, cause broadcast message 181 and/or probe message 187 to be sent. Thus, discovery control 601 can be utilized to discover any chassis on the local sub-net by broadcasting a message to all the chassis on the sub-net. The chassis will answer and a list of chassis can be created as the responses come back. Discovery control 601 can also be utilized to discover chassis on different sub-nets through a proxy chassis (e.g., chassis 121) located on that different sub-net. The name or IP of the proxy chassis can be entered and cached at a requesting computer system prior to utilizing the proxy chassis.

Accordingly, the discovery process for chassis on other sub-nets can include entering a name or IP address of a proxy chassis on a different subnet. For example, a user or technician can enter a proxy name or IP address into field 602. Currently and previously entered proxies are cached. Display area 603 depicts a plurality of cached proxies. Non-responsive proxies can be cleared and removed from display area 603. In the background, user-interface 119 launches discovery of all sub-nets (through cached or discovered proxies on each sub-net). For example, user-interface 119 can send probe message 187 to chassis 121. As depicted in display area 603, "Chassis A" is selected. Accordingly, "Chassis A" is represented in a more detailed format as selected chassis 604.

Figure 1B:
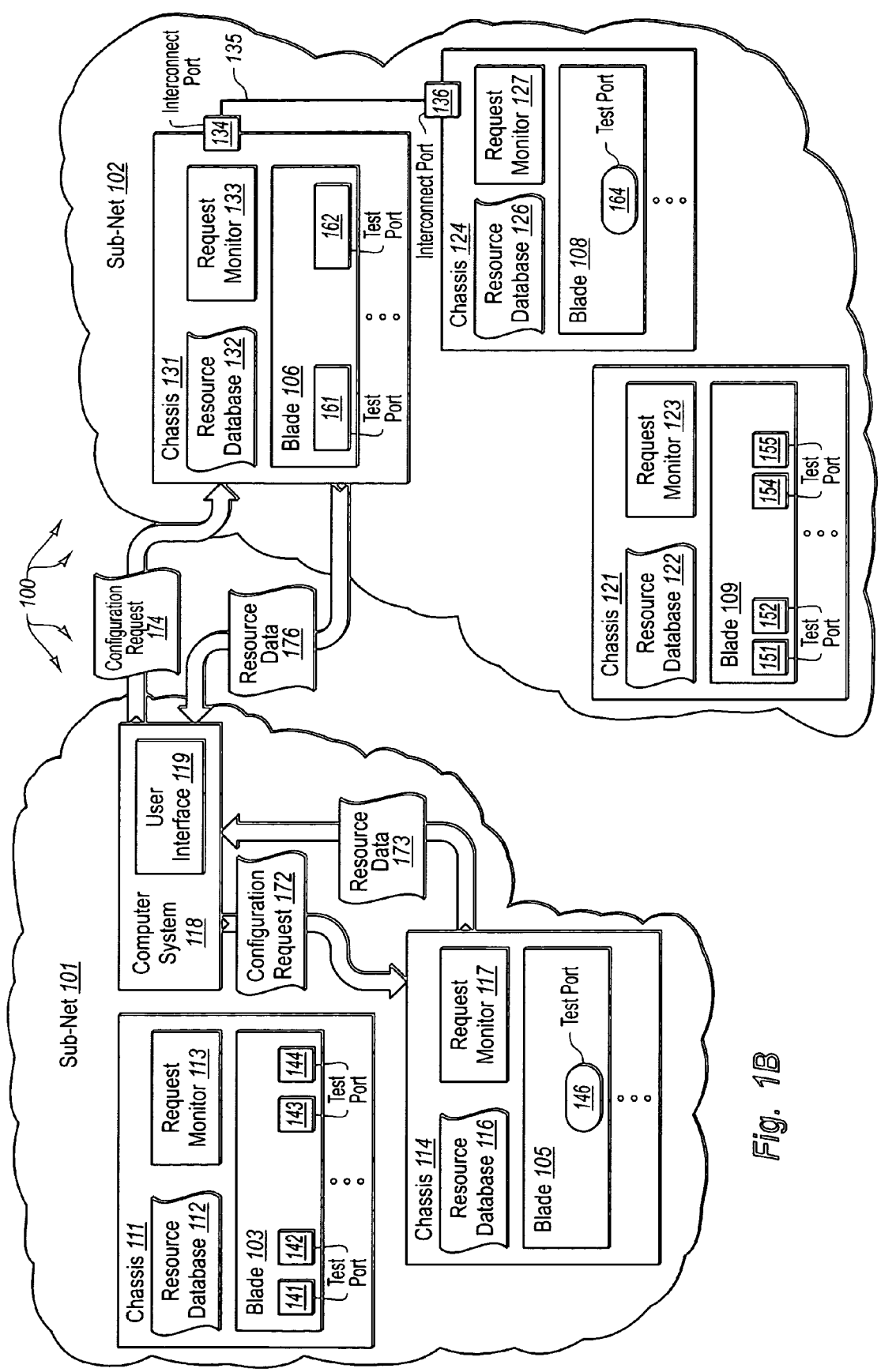
FIG. 1B illustrates an example of network architecture and associated modules and data structures for discovering diagnostic port functionality in accordance with the principles of the present invention.

FIG. 1B illustrates an example of network architecture 100 and associated modules and data structures for discovering diagnostic port functionality in accordance with the principles of the present invention. Each of chassis 111, 114, 121, 124, and 131 can have a resource database that maintains resource data representing the configuration of blades and ports contained in the corresponding chassis. For example, resource database 132 maintains resource data at least for blade 106 and test ports 161 and 162, A requesting computer system can request resource data maintained in a chassis resource database. This can include sending a request to a network address corresponding to the chassis, such as, for example, an IP address previously discovered by the requesting computer system. For example, computer system 118 can send configuration request 172 to a network address corresponding to chassis 114 (e.g., network address 183). A request monitor at a chassis can respond to a request for resource data by returning at least a portion of resource data contained in corresponding resource database. For example, request monitor 117 can respond to configuration request 172 by sending resource data 173 (a portion of resource data contained in resource database 116) to computer system 118.

A requesting computer system can request resource data from a chassis in a different sub-net. For example, computer system 118 (in sub-net 101) can send configuration request 174 to chassis 131 (in sub-net 102). Request monitor 133 can respond to configuration request 174 by returning resource data 176 (a portion of resource data contained in resource database 132) to computer system 118. User-interface 119 can present received resource data at computer system 118.

Displaying and Organizing Ports

After chassis have been found, a user-interface can be populated with resource data coming from a server on each of the chassis. The resource data can include information about the chassis itself, each of the blades, and each of the ports including status and configuration options.

The user-interface can display all the chassis, blades, and ports found according to specified classifications.

The user-interface can list the available personalities for each programmable logic module (e.g., each FPGA), for example, based on programmable logic module type and licensing information.

Figure 7:
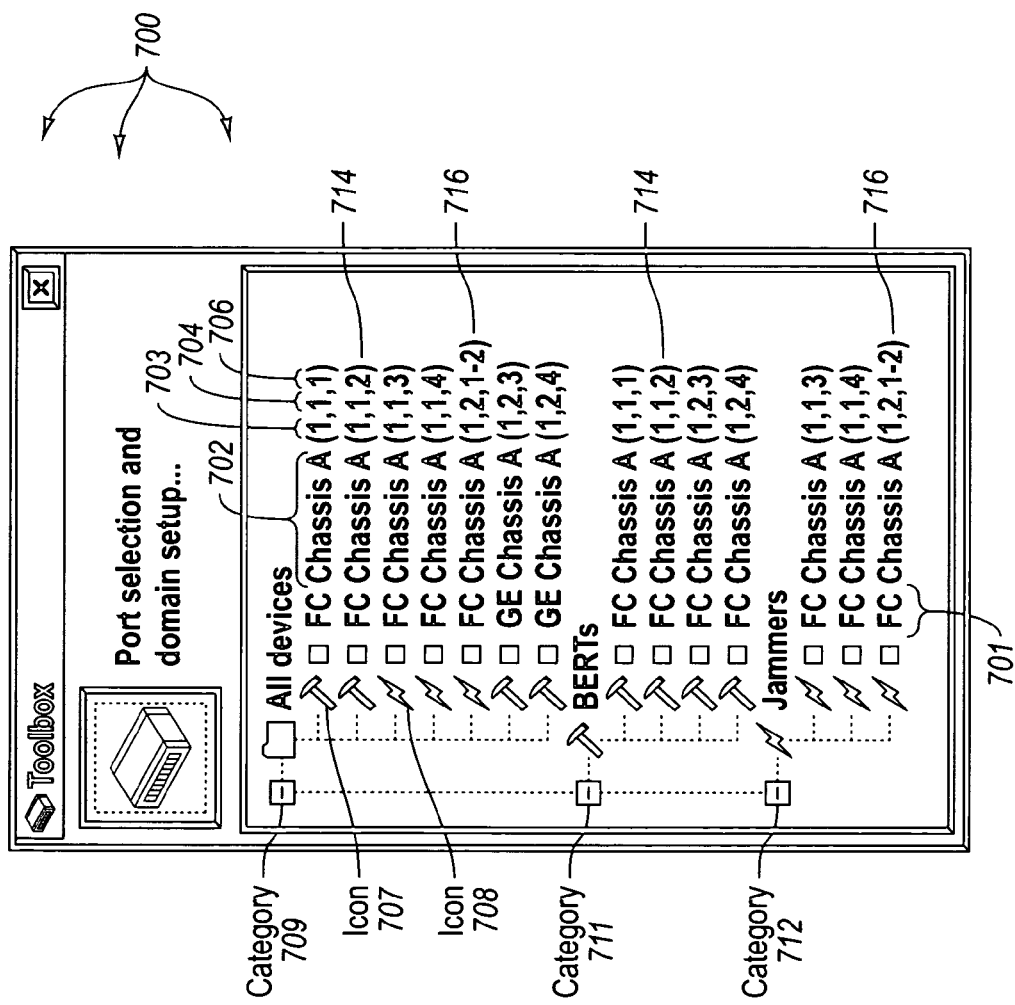
FIG. 7 illustrates an example user-interface screen for presenting organized ports.

Ports can be organized in folders by type and current configuration. Since ports can belong to a plurality of categories, ports can be represented in a plurality of corresponding folders. FIG. 7 illustrates an example user-interface screen 700 for presenting organized ports. Classification of the chassis in user-interface screen 700 is divided into three categories, category 709, category 711, and category 712. However, additional categories can be included. Each category can be represented by a folder that includes one or more ports.

For example, category 709 includes all devices (e.g., discovered devices). Different icons can be utilized to represent different functionality. For example, icon 707 can be used to represent ports implementing BERTs and icon 708 can be used to represent ports implementing Jammers. Other icons can be used to represent ports implementing network analyzers, generators, and other diagnostic functions. Category 711 includes all ports implementing BERTs and category 712 includes all ports implementing Jammers.

Within each category, various information identifying a port and a corresponding configuration are displayed. Column 701 displays the protocol (e.g., Fibre Channel ("FC"), Gigabit Ethernet ("GE"), etc.) corresponding to a port. The protocol can represent the physical connector form-factor of the port. Column 702 displays the name of the chassis the port is included in. Column 703 displays the chassis number representing the chassis the port is included in. Column 704 displays the slot number of the blade the port is included in. Column 705 displays the port number of the port.

For example, entry 714 represents port 2 of a blade in slot 1 of chassis 1. Chassis 1 is named Chassis A and the represented port 1 is a Fibre Channel port. Since entry 714 represents an implemented BERT, entry 714 is included in both category 709 ("All devices") and category 711 ("BERTs"). Entry 716 represents ports 1 and 2 of a blade in slot 2 of chassis 1. The represented ports 1 and 2 are Fibre Channel ports. Since entry 716 represents an implemented Jammer, entry 716 is included in both category 709 ("All devices") and category 712 ("Jammers").

User-interface screen 700 (as well as user-interface 119) is extensible to include additional categories. Causing a port at the user-interface to correspond to a physical port can be facilitated using a chassis\blade\port tree or table. Likewise, when selecting a port, the chassis name, slot number and port number can be presented along with the current speed, protocol, locking status/owner, current personality, etc.

Following is a list of example categories that can be implemented to organize the display of ports:
Chassis\Blades\Ports
SubNet\Chassis
SyncDomain\Chassis
SyncDomain\Ports
MyLockedPorts\Ports
BladeType\Ports
AvailablePorts\Ports
AllPorts\Ports
RecentlyUsed\Ports
Favorites\Chassis
Favorites\Ports
BladeType\Blade
CanBeA[2G FC-A, 10G FC-A, GE-A, 10G GE-A, IB-A, 2G-B, 10G-B, G, FC-J, GE-J, . . . ]\Ports
IsCurrentlyAvailable\Ports
Clock Rate1.065, 1.25, 2.125, 2.5, 10.3125, 10.51875, . . . ]\Ports
Protocol[FC, GE, IB]\Ports
Licensed personalities\Ports Accordingly, a user, technician, or application using the user-interface can customize the organization of ports at least according to the listed categories.

Displaying More Detailed Information About A Chassis, Blade or Port

A list of ports and corresponding information can be received separate from port categories. A user-interface (e.g., user-interface 119) can present ports in a tree like control according to received categories and show corresponding port information in a separate display portion when a port is selected.

Figure 8:
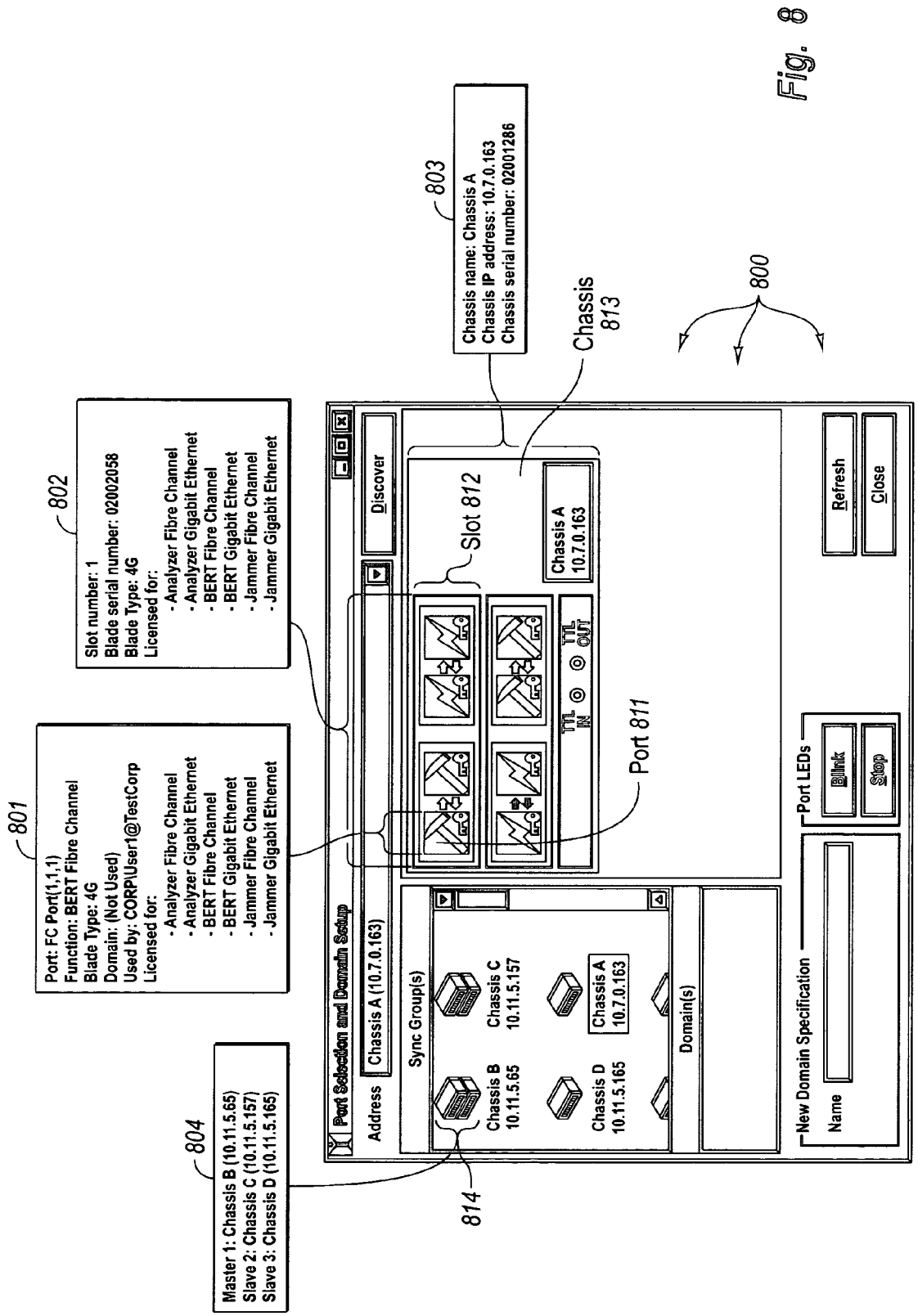
FIG. 8 depicts a first example user-interface screen for presenting more detailed information for a port, slot, chassis, and sync group.

FIG. 8 depicts a first example user-interface screen 800 for presenting more detailed information for a port, slot, or chassis. More detailed information can correspond to a port, slot, chassis, synch group, or TTL port selected at user-interface screen 600. More detailed information displayed at user-interface screen 800 can include name/value pairs representing resource names and corresponding values.

For example, when port 811 is selected more detailed information 801 is displayed. When slot 812 is selected more detailed information 802 is displayed. When chassis 813 is selected more detailed information 803 is displayed. When sync group 814 is selected more detailed information 804 is displayed. Detailed information 804 indicates that Chassis B is the master (first in a daisy-chained stack of chassis) and that Chassis B1 and B2 are slaves (or other chassis in a daisy-chained stack of chassis).

Figure 9:
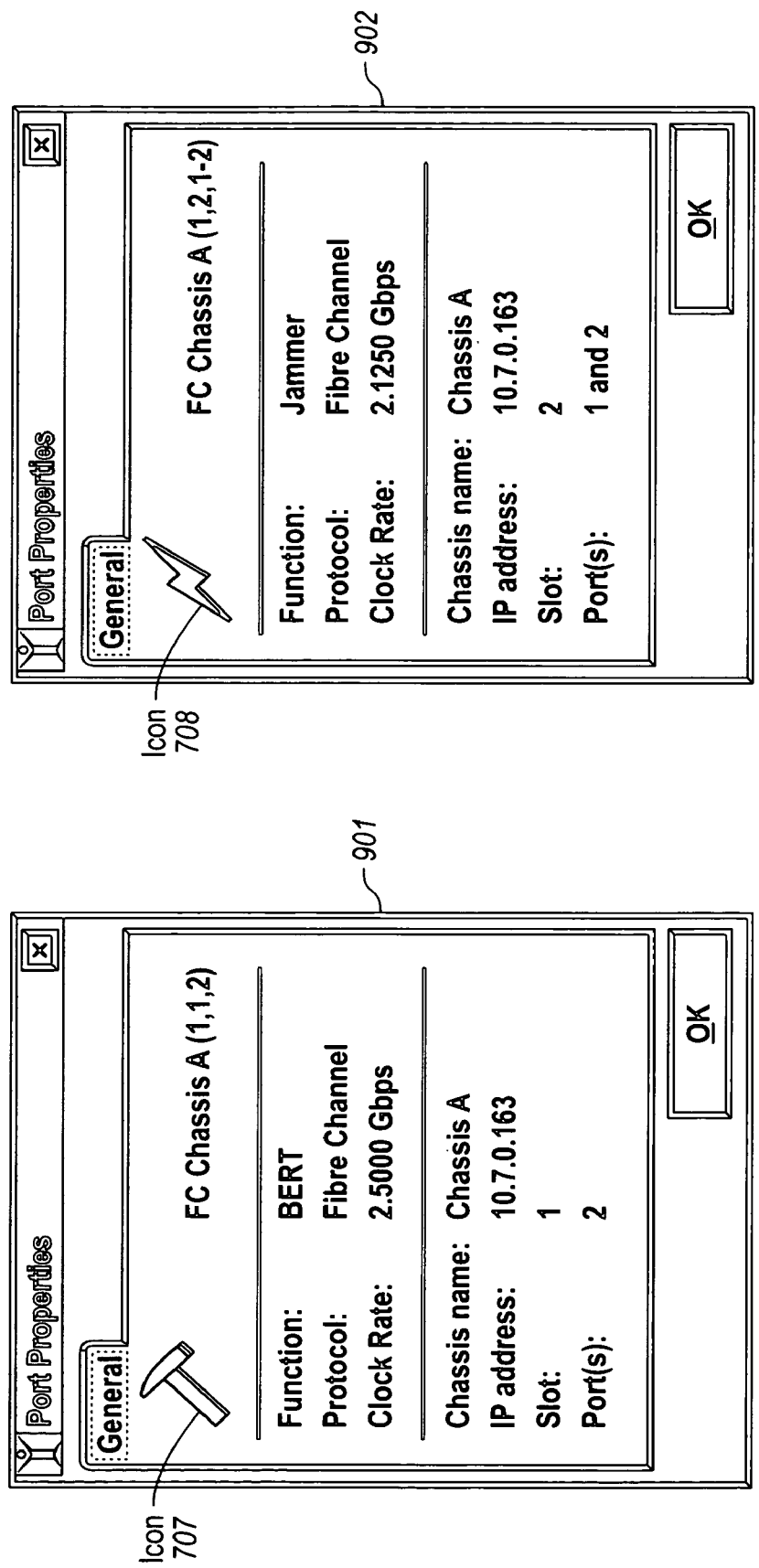
FIG. 9 depicts second example user-interface screens for presenting more detailed information for a port.

FIG. 9 depicts second example user-interface screens 901 and 902 for presenting more detailed information for a port. User-interface screens 901 and 902 can correspond to entries of user-interface screen 700. For example, user-interface screen 901 corresponds to entry 714 and user-interface screen 902 corresponds to entry 716. More detailed information displayed in user-interface screens 901 and 902 can include name/value pairs representing resource names and corresponding values.

Accordingly, a user-interface can:
Request and receive information about the ports from a server on the chassis, for example, from a resource database
Display the ports in a tree like structure according to the categories given by the server (e.g., in folders)
Update the information displayed in the background
Allow a user, technician, or application to select which categories to use and display (e.g., do not show the BERT folder in the Generator category)
Display information (e.g., received from a resource database) about an individual port in a different display panel with a list of name-value pairs:
Location: Chassis, Blade, Port
Type
Current Personality and Possible Personality
Locking Status and Current Owner
Protocol and Speed
Blink the LED corresponding to a selected port
Lock a port
Lock a group of ports (locking the folder)
Display information (e.g., received from a resource database) about a slot, chassis, TTL port, or sync group in a different display panel with a list of name-value pairs.

Name values provided by a server (e.g., from a resource database) can have information in addition to the name and value. For example, values can be colored, flagged as read-only or editable, flagged as standard or advanced options, displayed as selectable options in a menu, displayed as check boxes. Further, name descriptions and tooltips can also be displayed. Standard values can be shown by default and the advanced values can be displayed when a user checks an advanced option. If too many values are displayed, rows can be collapsed based on groups for values.

If a value is changed at a user-interface, the user-interface can return the name and value back to the server.

Figure 2:
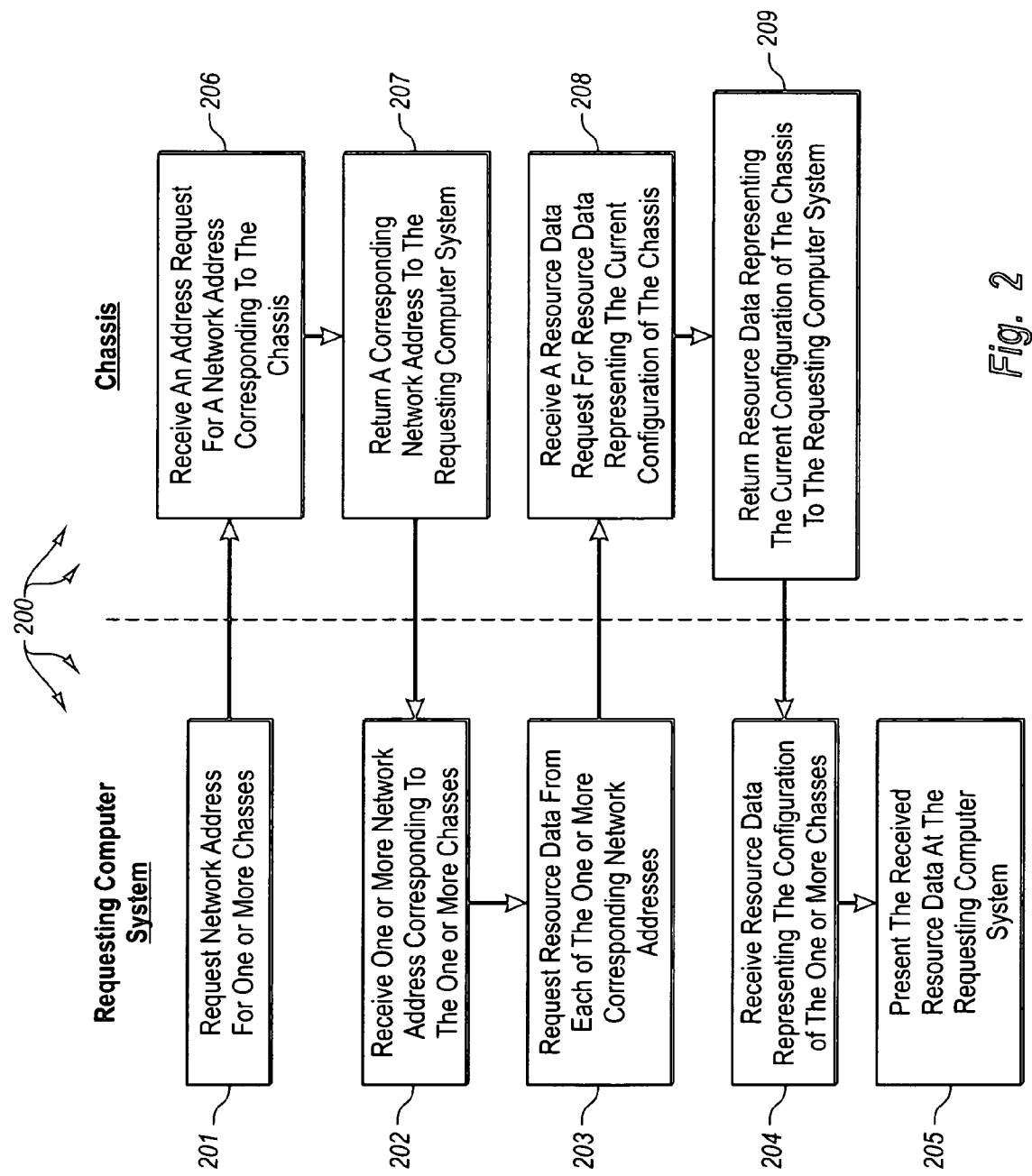
FIG. 2 illustrates a flowchart of a method for discovering diagnostic port functionality in accordance with the principles of the present invention.

FIG. 2 illustrates a flowchart of a method 200 for discovering diagnostic port functionality in accordance with the principles of the present invention. The method 200 will be discussed with respect to the modules and data structures depicted in network architecture 100. The method 200 includes an act of requesting network addressed for one or more chassis (act 201). Act 201 can include a requesting computer system send a network address request to one or more chassis. For example, computer system 118 can send broadcast message 181 and probe message 187 to request network addresses (e.g., IP addresses) for chassis included in network architecture 100. A proxy chassis can also be viewed as a requesting computer system. For example, chassis 121 can send broadcast message 188 to request network addresses for chassis include in sub-net 102.

The method 200 includes an act of receiving an address request for a network address corresponding to the chassis (act 206). Act 206 can include a chassis receiving an address request for a network address corresponding to the chassis. An address request for a network address can be a broadcast message or a probe message. For example, request monitors 113 and 117 can receive broadcast message 181. Request monitor 123 can receive probe message 187. Request monitors 133 and 127 can receive broadcast message 188.

The method 200 includes an act of returning a corresponding network address to the requesting computer system in response to the address request (act 207). Act 207 can include a chassis returning a corresponding network address to a requesting computer system in response to the address request. For example, chassis 111 and chassis 114 can return network address 182 and network address 183 respectively to computer system 118. Likewise, chassis 131 and chassis 124 can return network address 184 and network address 186 respectively to chassis 121. Chassis 121 can include network address for chassis in sub-net 102 in a response that is returned to computer system 118. For example, chassis 121 can include network address 184 and network address 186 in response 185. Optionally, chassis 121 can include a network address, such as, for example, network address 199, that corresponds to chassis 121. Alternatively, chassis 131 and chassis 124 can return network address 184 and network address 186 respectively directly to computer system 118.

The method 200 includes an act of receiving one or more network addresses corresponding to the one or more chassis (act 202). Act 202 can include a requesting computer system receiving one or more network addresses corresponding to the one or more chassis. For example, computer system 118 can receive network addresses 182 and 183 and response 185 containing network addresses 184 and 186 and potentially containing network address 199. Chassis 121 can receive network addresses 184 and 186.

The method 200 includes an act of requesting resource data from each of the one or more corresponding network addresses (act 203). Act 203 can include a requesting computer system sending a resource data request to each of the one or more corresponding network addresses. For example, computer system 118 can utilize network address 183 to send configuration request 172 to chassis 114. A requesting computer system can also send requests for resource data to chassis in other sub-nets. For example, computer system 118 can utilize network address 184 to send configuration request 174 to chassis 131.

The method 200 includes an act of receiving a resource data request for resource data representing the current configuration of the chassis (act 208). Act 208 can include a chassis receiving a resource data request for resource data representing the current configuration of the chassis. For example, request monitor 117 can receive configuration request 172 from computer system 118. Similarly, request monitor 133 can receive configuration request 174 from computer system 118.

The method 200 includes an act of returning resource data representing the current configuration or the chassis to the requesting computer system in response to the resource data request (act 209). Act 209 can include a chassis returning resource data representing the current configuration or the chassis to the requesting computer system in response to the resource data request. For example, chassis 114 can return resource data 173 to computer system 118. Similarly, chassis 131 can return resource data 176 to computer system 118.

The method 200 includes an act of receiving resource data representing the configuration of the one or more chassis (act 204). Act 204 can include a requesting computer system receiving resource data representing the configuration of the one or more chassis. For example, computer system 118 can receive resource data 173 and resource data 176 from chassis 114 and chassis 131 respectively.

The method 200 includes an act of presenting the received resource data at the requesting computer system (act 205). Act 205 can include the requesting computer system presenting the received resource data at the requesting computer system. For example, user-interface 119 can present resource data 173 and resource data 176 at computer system 118.

Figure 3:
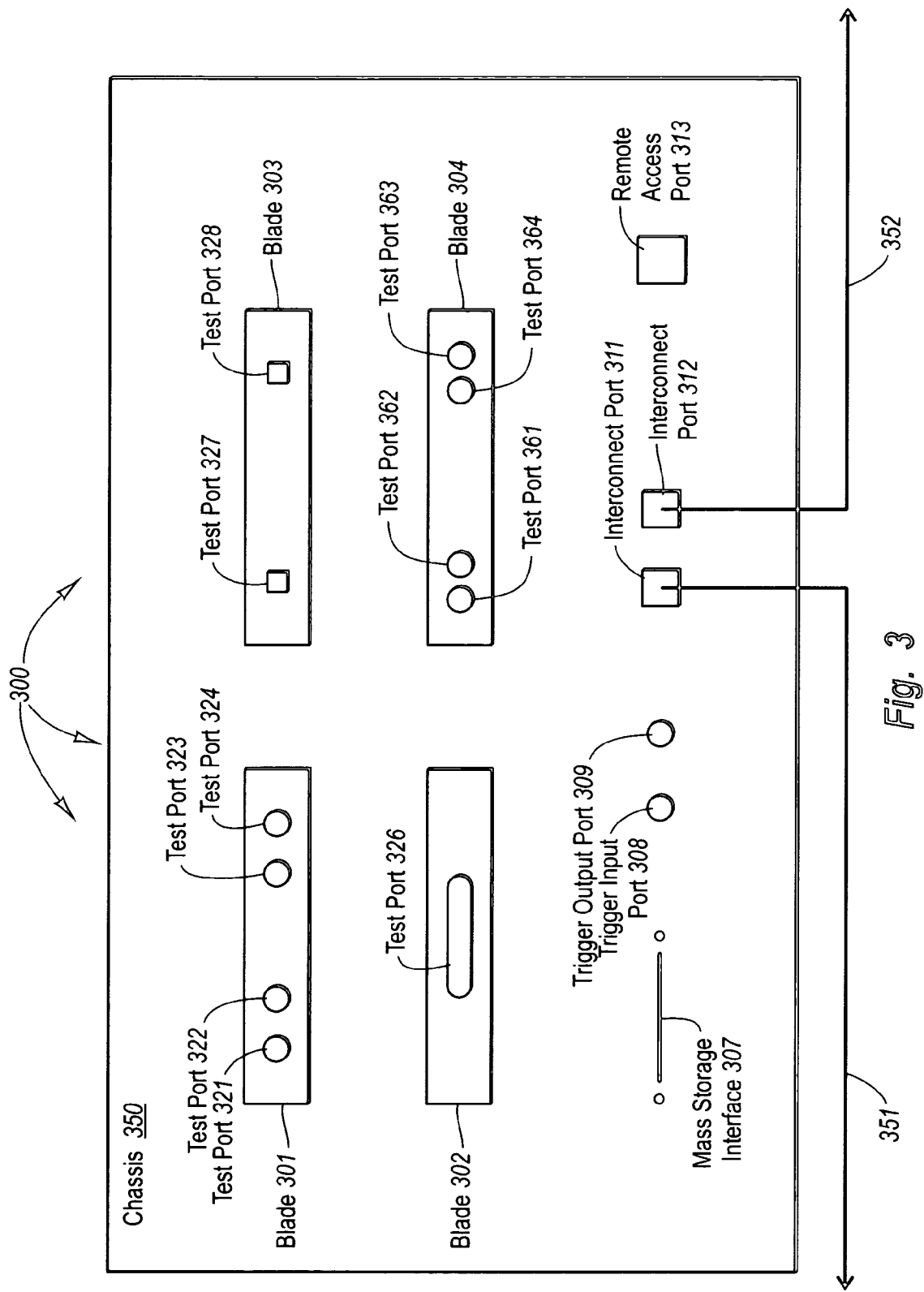
FIG. 3 illustrates an example chassis computer system architecture including a plurality of network diagnostic modules in accordance with the principles of the present invention.

Alternative embodiments for discovering port functionality can include:
1. A user starting a client application (e.g., user-interface 119)
2. The client application coming up in configuration only mode
3. The user selecting a Select Port button from a toolbar
4. A new window coming up with the Port Discovery Control
5. Automatically discovering and displaying chassis on a local subnet
6. The user entering the name (or IP address) of a Chassis in a different subnet and selecting a discover control
7. Discovering and displaying Chassis from the different subnets are along with the chassis from the local subnet
8. The user repeating steps 6 and 7 using different chassis as a proxy to discover. Discovery results can be displayed cumulatively.
9. Saving entered chassis names and/or IP address in a pull-down list for easy access
10. Discovering chassis in a non-blocking fashion to allow for parallel queries of previous chassis
11. Requesting and displaying information for each identified chassis, such as, for example, chassis and blade information, resources available, locks, users, port status, usage, etc FIG. 3 illustrates an example computer system architecture 300 including a plurality of network diagnostic modules in accordance with the principles of the present invention. Depicted in computer system architecture 300 is chassis 350, which includes blades 301, 302, 303, and 304. Although not expressly depicted, each of blades 301, 302, 303, and 304 are coupled, through an appropriate bus interface, to a computer system bus of chassis 350. For example, each of blades 301, 302, 303, and 304 can include PCI bus interfaces that are inserted into PCI receptacles at chassis 350. Accordingly, computer-executable or computer-interpretable instructions can be transferred over the computer system bus to blades 301, 302, 303, and 304 to configure and re-configure corresponding test ports.

Blades coupled to a chassis can have different numbers and configurations of test ports. For example, depicted at blade 301 test ports 321, 322, 323 and 324 can each be SFP ports. Depicted at blade 303 test ports 327 and 328 can be XFP ports. Depicted at blade 302 test port 326 can an XBI port. Depicted at blade 304 test ports 361, 362, 363, and 364 can be SFP ports. Accordingly, the test ports of chassis 350 can be simultaneously connected to the same or a variety of different networks, such as, for example, 10 Gigabit Ethernet, 100 Megabit Ethernet, Infiniband, and SONET networks, to implement the same or a variety of different network diagnostic functions.

Mass storage interface 307 can be an interface for coupling to mass storage devices. For example, mass storage interface 307 may be a Small Computer System Interface ("SCSI") that is coupled to a SCSI hard drive. Accordingly, as network diagnostic data is collected at blades 301, 302, 303, and 304, the network diagnostic data can be transferred to the SCSI hard drive for storage.

Interconnect ports 311 and 312 (e.g., RJ-45 ports) can be utilized to connect chassis 350 to other chassis (not shown). Connections from chassis 350 to other chassis, for example, as illustrated by links 351 and 352, can be utilized to transfer control signals that coordinate the collection of network diagnostic data. For example, the collection of network diagnostic data for a network analyzer implemented in blade 304 can be coordinated with the collection of network diagnostic data for a bit error rate tester implemented at another chassis coupled to link 351. Accordingly, through the exchange of control signals, it may be that test ports at a plurality of different chassis are configured to implement network diagnostic functions in a coordinated manner.

Trigger input port 308 and trigger output port 309 (e.g., TTL ports) can be utilized to transfer trigger signals to and from chassis 350. Generally, trigger signals can indicate the occurrence of an event to a chassis. In response to the occurrence of an event, a chassis can activate or deactivate network diagnostic functionality. For example, it may be that a programmable logic module controlling test port 326 is implementing a bit error rate tester. However, it may be desirable to activate bit error rate testing of a network coupled to port 326 only when a particular computer system is transmitting data onto the network. An appropriate mechanism for detecting when the particular computer system is transmitting data can be utilized to generate a trigger signal.

When a trigger signal is received at trigger input port 308, bit error rate testing through port test 326 can be activated or deactivated. In some embodiments, for example, when a plurality of chassis are connected, trigger inputs and outputs of different chassis can be coupled together so that the chassis receive the same triggers. For example, trigger input port 308 can be coupled to a trigger output port of a chassis connected to link 351 and/or trigger output port 309 can be coupled to a trigger input port of a chassis connected to link 352. Accordingly, when test ports at a plurality of different chassis are configured to perform coordinated network diagnostic functions, the network diagnostic functions can be activated and deactivated in response to the same events.

Remote access port 313 (e.g., an RJ-45 port) can be utilized to remotely configure chassis 350. Through remote access port 313, chassis 350 can be coupled to a network, such as, for example, a Local Area Network ("LAN") or Wide Area Network ("WAN"), along with one or more other computer systems. The other computer systems can utilize the network to access configuration information from chassis 350. The other computer systems can also initiate configuration requests to configure or re-configure ports included in chassis 350. Accordingly, an administrator or user at a remote computer system can configure the test ports of chassis 350 (as well as configuring test ports at other chassis connected to the network) to implement selected network diagnostic functions.

Figure 4:
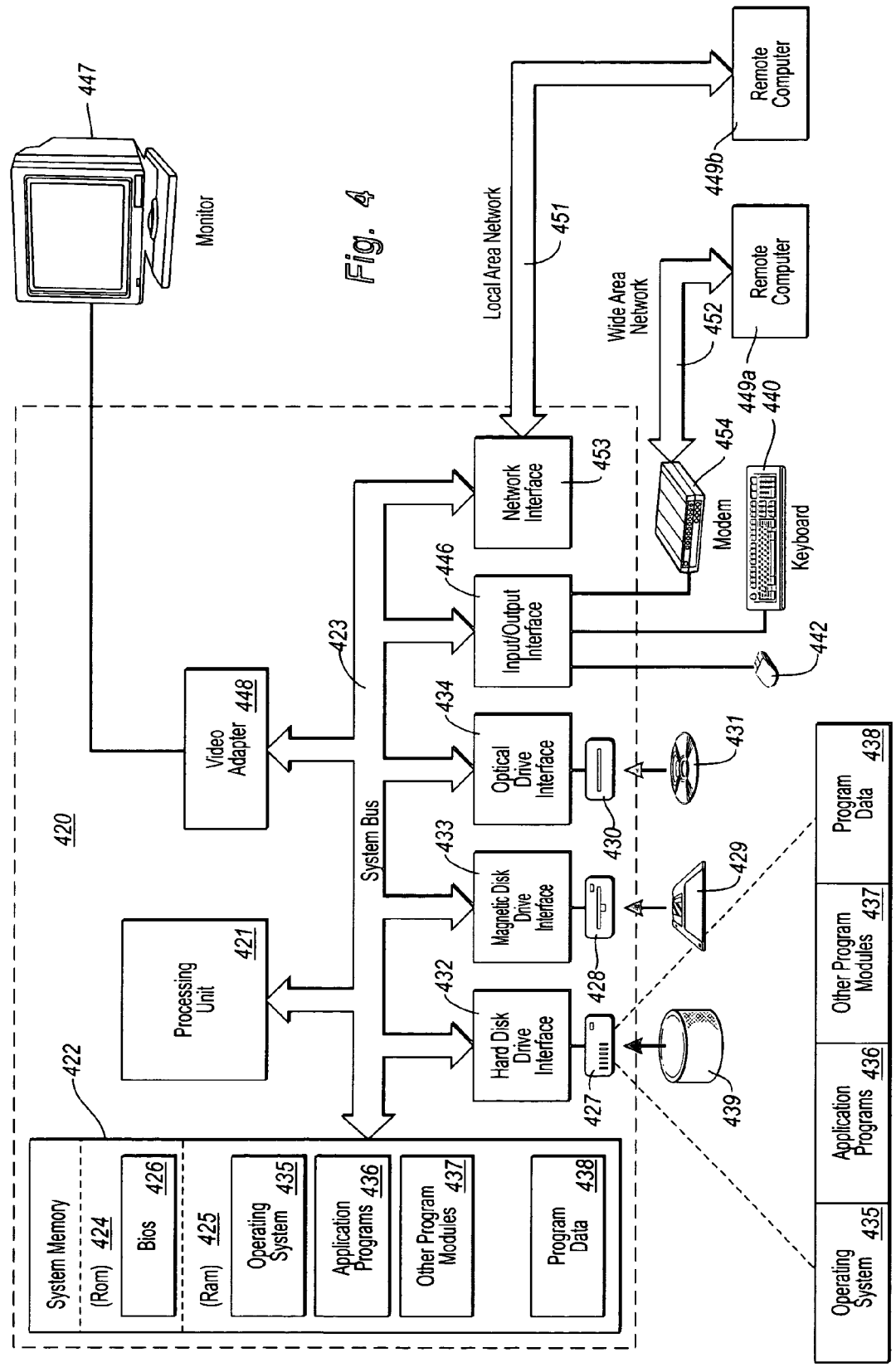
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a PCI bus, a peripheral bus, and a local bus using any of a variety of bus architectures. Computer system 420 can include one or more receptacles for receiving print circuit boards or "cards" that interface with system bus 423. System memory 422 includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 (e.g., a SCSI drive) for reading from and writing to a magnetic hard disk 439, a magnetic disk drive 428 for reading from or writing to a removable magnetic disk 429, and an optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437 (e.g., bit files), and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, computer system chassis containing network diagnostic modules, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 449b via link 451. Link 451 represents a portion of a network, and remote computer system 449b represents a node of the network.

Likewise, computer system 420 includes input/output interface 446, through which computer system 420 receives data from external sources and/or transmits data to external sources. Input/output interface 446 is coupled to modem 454, through which computer system 420 receives data from and/or transmits data to external sources. Alternately, modem 454 can be a Data Over Cable Service Interface Specification ("DOCSIS") modem or digital subscriber lines ("DSL") modem that is connected to computer system 420 through an appropriate interface. However, as depicted in FIG. 4, input/output interface 446 and modem 454 facilitate the exchange of data with remote computer system 449a via link 452. Link 452 represents a portion of a network, and remote computer system 449a represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 449a and/or remote computer system 449b. Execution of such modules may be performed in a distributed manner.

Figure 5:
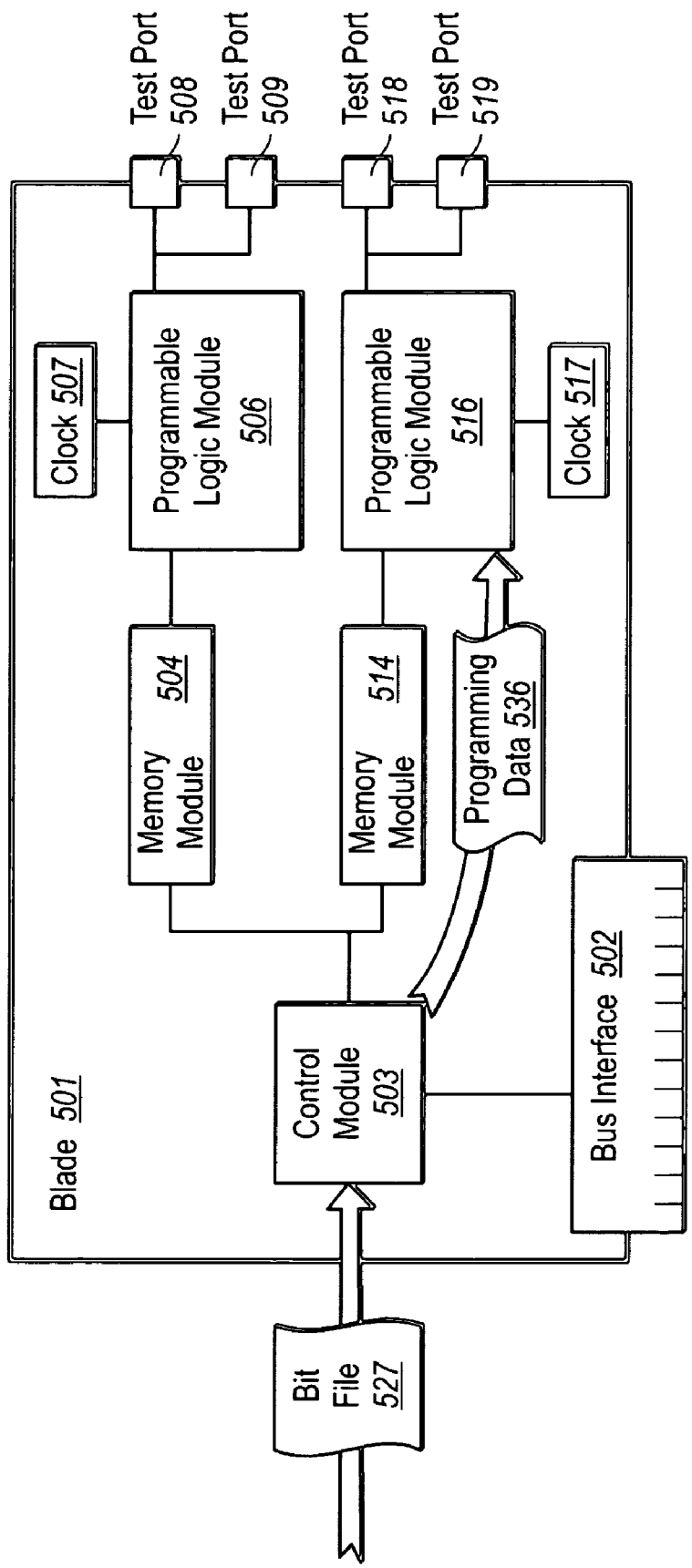
FIG. 5 illustrates an example of a network diagnostic module and diagnostic ports that can interoperate to implement a network diagnostic function in accordance with the principles of the present invention.

FIG. 5 illustrates an example of a network diagnostic module and test ports that can interoperate to implement a network diagnostic function. The network diagnostic module and test ports are implemented in blade 501, which can be a printed circuit board. Bus interface 502 can be inserted into an appropriate receptacle (e.g., a Peripheral Component Interconnect ("PCI") interface) at a computer system to communicatively couple blade 501 to the computer system. Blade 501 can communicate (e.g., sending and receiving appropriate electrical signaling) with a corresponding computer system bus (e.g., a PCI bus) through bus interface 502.

Blade 501 includes memory 504 and programmable logic module 506 that control the functionality of test ports 508 and 509. Memory 504 can be any of a variety of different types of memory, such as, for example, Random Access Memory ("RAM"). Memory 504 can be used by programmable logic module 506 in its operation (e.g., to receive and transmit data or store other information) and to buffer data that is transferred between programmable logic module 506 and control module 503. Programmable logic module 506 can be virtually any type of programmable circuit, such as, for example, a Field-Programmable Gate Array ("FPGA"), Programmable Logic Array ("PLA"), or other type programmable logic device. Programmable logic module 506 can include circuitry form implementing any of a plurality of network diagnostic functions (e.g., network analyzer, jammer, generator, or bit error rate tester, etc).

It may be that a network diagnostic function is part of a "port personality" represented in a bit file. For example, a port personality can include a network diagnostic function, a clock rate (e.g., 1.0625, 2.125, or 2.5 Gigabits per second), and a protocol (e.g., Fibre Channel, Gigabit Ethernet, Infiniband, etc). Accordingly, programmable logic module 106 can process computer-executable, computer-interpretable instructions, or circuit design data to cause programmable logic module 506 and test port 508 and/or test port 509 to interoperate to implement a port personality in accordance with the processed computer-executable, computer-interpretable instructions, or circuit design data. For example, programmable logic module 506 can process instructions from a bit file to cause programmable logic module 506 and test ports 508 and test port 509 to interoperate to implement a Fibre Channel jammer at 2.125 Gbps. Accordingly, the personality of test port 508 and the personality of test port 509 can include implementation of a particular network diagnostic function.

It may that a plurality of test ports are utilized together to implement a particular network diagnostic function. For example, test ports 508 and 509 can be utilized together to implement a network analyzer. On the other hand, it may be a first test port is utilized to implement a first network diagnostic function, while a second different test port is simultaneously utilized to implement a second different network diagnostic function. For example, test port 508 can be utilized to implement a generator, while test port 509 is simultaneously utilized to implement a bit error rate tester. A bit file having appropriate instructions can be loaded at a programmable logic module 506 to cause test port 508 and test port 509 to simultaneously implement different network diagnostic functions. Clock 507 can coordinate the appropriate timing of data transferred to and from test port 508 and test port 509.

Blade 501 also includes memory 514 and programmable logic module 516 that control the functionality of test ports 518 and 519. Similar to memory 504, memory 514 can be any of a variety of different types of memory, such as, for example, Random Access Memory ("RAM"). Memory 514 can be used by programmable logic module 506 in its operation (e.g., to receive or transmit network data or store other information) and to buffer data that is transferred between programmable logic module 516 and control module 503. Similar to programmable logic module 506, programmable logic module 516 can be virtually any type of programmable circuit, such as, for example, a Field-Programmable Gate Array ("FPGA"), Programmable Logic Array ("PLA"), or other type programmable logic device. Similar to programmable logic module 506, programmable logic module 516 can include circuitry form implementing any of a plurality of network diagnostic functions (e.g., network analyzer, jammer, generator, or bit error rate tester, etc). Although not required, it may be that programmable module 506 and programmable logic module 516 are the same type of programmable logic module.

Similar to programmable logic module 506, programmable logic module 516 can process computer-executable, computer-interpretable instructions, or circuit design data (e.g., programming data 536) to cause programmable logic module 516 and test port 518 and/or test port 519 to interoperate to implement a port personality (including network diagnostic function, clock rate, and protocol) in accordance with the processed computer-executable, computer-interpretable instructions., or circuit design data. Test ports 518 and 519 can be utilized together to implement a particular network diagnostic function. On the other hand, test port 518 may be utilized to implement a first network diagnostic function, while test port 519 is utilize to implement a second different network diagnostic function.

For example, programmable logic module 516 can process programming from a bit file (e.g., bit file 527) to cause programmable logic module 516 and test port 518 to interoperate to implement a Fibre Channel bit error rate tester at 2.125 Gbps and to cause programmable logic module 516 and test ports 518 and 519 to interoperate to implement a Fibre Channel generator at 1.0625 Gbps. A bit file having appropriate programming data can be loaded at programmable logic module 516 to cause test port 518 and test port 519 to simultaneously implement different network diagnostic functions. Clock 517 can coordinate the appropriate timing of data transferred to and from test port 518 and test port 519.

Test ports of different programmable logic modules can be configured to implement the same personalities. For example, programmable logic module 506 may process instructions that that cause test ports 508 and 509 to implement a Gigabit Ethernet analyzer at 1.0625 GBps, while programmable logic module 516 also processes instructions that cause test ports 518 and 519 to implement a Gigabit Ethernet analyzer at 1.25 GBps. On the hand, test ports of different programmable logic modules can be configured to implement different personalities. For example, programmable logic module 106 may process instructions that that cause test ports 508 and 509 to implement a Fiber Channel analyzer at 2.125 GBps, while programmable logic module 116 processes instructions that cause test ports 518 and 519 to implement an Gigabit Jammer at 1.25 GBps.

Test ports 508, 509, 518 and 519 can be of virtually any physical configuration, such as, for example, RJ-11, RJ-45, small form-factor pluggable ("SFP"), Universal Serial Bus ("USB"), IEEE 1394 (Firewire), XBI, a XENPAK module (70-pin configuration), etc. Test ports 508, 509, 518 and 519 can be configured to receive virtually any type of cabling, such as, for example, cabling that carries electrical signals or carries optical signals. Test ports 508, 509, 518 and 519 can be configured to receive connectors that facilitate communication using any of a variety of protocols, including Serial Attached SCSI ("SAS") and Serial ATA ("SATA") protocols. Although not required, it may be that ports controlled by the same programmable logic module are configured as the same type of port. For example, test ports 508 and 509 (both controlled by programmable logic module 506) may both be SFP ports configured to receive optical cable.

Control module 503 coordinates the transfer of data between bus interface 502 and memories 504 and 514. Control module 503 can translate data received from bus interface 502 (e.g., a PCI interface) into a format that can be processed by programmable logic modules included in blade 501. Likewise, control module 503 can translate data received from a programmable logic module into a format that can be compatibly transferred over a computer system bus (e.g., a PCI bus) that is communicatively coupled to bus interface 502. Based on received data (e.g., appropriate addressing information), control module 503 can also identify the programmable logic module that is associated with the received data. Accordingly, control module 503 can transfer at least a portion of the received data (e.g., computer-executable, computer-interpretable instructions or circuit design data) to the associated programmable logic module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a requesting computer system that is network connectable to one or more chassis, a method for discovering resource data representing the current configuration of the one or more chassis, the method comprising the acts of:
   requesting network addresses for the one or more chassis that each include one or more network diagnostic modules that provide network testing functionality for a network, wherein the one or more chassis are located in different sub-nets;
   receiving one or more network addresses corresponding to the one or more chassis;
   requesting resource data from each of the one or more chassis using the corresponding network addresses;
   receiving resource data representing the configuration of the one or more chassis;
   presenting the received resource data at the requesting computer system on a user interface at the requesting computer system; and
   reconfiguring the network testing functionality based on the received resource data presented in the user interface.

2. The method as recited in claim 1, wherein the act of requesting network addresses comprises an act of sending an UDP broadcast message.

3. The method as recited in claim 1, wherein the act of requesting network addresses comprises an act of requesting IP addresses.

4. The method as recited in claim 1, wherein the act of requesting network addresses comprises an act of sending a probe message to a proxy chassis.

5. The method as recited in claims 1, wherein the act of receiving one or more network addresses corresponding to the one or more chassis comprises an act of receiving one or more IP addresses corresponding to the one or more chassis.

6. The method as recited in claim 1, wherein the act of receiving one or more network addresses corresponding to the one or more chassis comprises an act of receiving a response from a proxy chassis, the response containing one or more network addresses corresponding to at least one chassis in the same sub-net as the proxy chassis.

7. The method as recited in claim 1, wherein the act of receiving resource data representing the configuration of the one or more chassis comprises an act of receiving resource data representing the configuration of blades and ports at the one or more chassis.

8. The method as recited in claim 1, wherein the act of presenting the received resource data at the requesting computer system comprises an act of presenting resource data representing the configuration of blades and ports at the one or more chassis.

9. The method as recited in claim 1, wherein the act of presenting the received resource data at the requesting computer system comprises an act of presenting resource data for at least one chassis that is included in a different sub-net than the requesting computer system.

10. The method as recited in claim 1, wherein the act of presenting the received resource data comprises an act of presenting a list of chassis in a sync group.

11. The method as recited in claim 1, further comprising:
   an act of receiving a user-entered network address for a chassis that is in a different sub-net than the requesting computer system prior to requesting the network address for the one or more chassis.

12. In a chassis that is network connectable to one or more other chassis and to a requesting computer system, each chassis including one or more network diagnostic modules, a method for providing resource data representing the current configuration of a chassis, the method comprising the acts of:
receiving an address request for a network address corresponding to the chassis, the address request originating at the requesting computer system in a different sub-net and the chassis having one or more network diagnostic modules for providing network testing functionality;
returning a corresponding network address in response to the address request;
receiving a resource data request for resource data representing the current configuration of the chassis, the resource data request originating at the requesting computer system;
returning resource data representing the current configuration of the chassis to the requesting computer system in response to the resource data request; and
organizing the resource data for presentation in a user interface, the resource data organized at least according to categories; and
reconfiguring the network testing functionality of the one or more network diagnostic modules of the chassis based on the resource data displayed in the user interface at the requesting computer system.

13. The method as recited in claim 12, wherein the act of receiving an address request for a network address corresponding to the chassis comprises an act of a request monitor detecting a message at a UDP port.

14. The method as recited in claim 12, wherein the act of receiving an address request for a network address corresponding to the chassis comprises an act of detecting a broadcast message.

15. The method as recited in claim 12, wherein the act of receiving an address request for a network address corresponding to the chassis comprises an act of receiving a probe message.

16. The method as recited in claim 12, wherein the act of returning a corresponding network address in response to the address request comprises an act of returning an IP address.

17. The method as recited in claim 12, wherein the act of returning a corresponding network address in response to the address request comprises an act of returning one or more IP addresses for other chassis in the same subnet as the chassis.

18. The method as recited in claim 12, wherein the act of returning a corresponding network address in response to the address request comprises an act of a proxy chassis returning a corresponding network address.

19. The method as recited in claim 12, wherein the act of receiving a resource data request for resource data representing the current configuration of the chassis comprises an act of receiving a request for resource data representing the configuration of blades and ports at the chassis.

20. The method as recited in claim 12, wherein the act of returning resource data representing the current configuration of the chassis comprises an act of returning resource data representing the current configuration of blades and ports at the chassis.

21. The method as recited in claim 12, further comprising:
an act of receiving a further resource data request for resource data representing the current configuration of the chassis; and
an act of returning resource data representing the current configuration of the chassis to the requesting computer system in response to the further resource data request.

22. A computer program product for use in a requesting computer system that is network connectable to one or more chassis that each include one or more network diagnostic modules, the computer program product for implementing a method for discovering resource data representing the current configuration of the one or more chassis, the computer program product comprising one or more computer-readable media having stored thereon computer-executable instructions that, when executed by a processor, cause the requesting computer system to perform the following:
request network addresses for the one or more chassis, wherein at least one of the one or more chassis is in a different sub-net than the requesting computer system, wherein the network address for the at least one of the one or more chassis is performed through a proxy chassis;
receive one or more network addresses corresponding to the one or more chassis;
request resource data from each of the one or more corresponding network addresses;
receive resource data representing the configuration of the one or more chassis; and
present the received resource data at the requesting computer system including a list of chassis in a sync group.

23. The computer program product as recited in claim 22, wherein computer-executable instructions that, when executed, cause the requesting computer system to request network addresses comprise computer-executable instructions that, when executed, cause the requesting computer system to send an UDP broadcast message.

24. The computer program product as recited in claim 22, wherein computer-executable instructions that, when executed, cause the requesting computer system to request network addresses comprise computer-executable instructions that, when executed, cause the requesting computer system to requesting IP addresses.

25. The computer program product as recited in claim 22, wherein computer-executable instructions that, when executed, cause the requesting computer system to request network addresses comprise computer-executable instructions that, when executed, cause the requesting computer system to send a probe message to a proxy chassis.

26. The computer program product as recited in claim 22, wherein computer-executable instructions that, when executed, cause the requesting computer system to receive one or more network addresses corresponding to the one or more chassis comprise computer-executable instructions that, when executed, cause the requesting computer system to receive one or more IP addresses corresponding to the one or more chassis.

27. The computer program product as recited in claim 22, wherein computer-executable instructions that, when executed, cause the requesting computer system to receive resource data representing the configuration of the one or more chassis comprise computer-executable instructions that, when executed, cause the requesting computer system to receive resource data representing the configuration of blades and ports at the one or more chassis.

28. The computer program product as recited in claim 22, further comprising computer-executable instructions that, when executed, cause the requesting computer system to perform the following:
receive a user-entered network address for a chassis that is in a different sub-net than the requesting computer system prior to requesting the network address for the one or more chassis.

29. A computer program product for use in a chassis that is network connectable to one or more other chassis and to a requesting computer system, each chassis including one or more network diagnostic modules, the computer program product for implementing a method for providing resource data representing the current configuration of a chassis, the computer program product comprising one or more computer-readable media having stored thereon computer-executable instructions that, when executed by a processor, cause the chassis to perform the following:

receive an address request for a network address corresponding to the chassis, the address request originating at the requesting computer system that is located in a different subnet;

return a corresponding network address in response to the address request;

receive a resource data request for resource data representing the current configuration of the chassis, the resource data request originating at the requesting computer system;

return resource data representing the current configuration of the chassis to the requesting computer system in response to the second request; and reconfiguring network testing functionality provided by the current configuration of the chassis based on the resource data from the requesting computer system.

30. The method as recited in claim 29, wherein computer-executable instructions that, when executed, cause the chassis to receive an address request for a network address comprise computer-executable instructions that, when executed, cause the chassis to detect a message at a UDP port.

31. The method as recited in claim 29, wherein computer-executable instructions that, when executed, cause the chassis to receive an address request for a network address comprise computer-executable instructions that, when executed, cause the chassis to detect a broadcast message.

32. The method as recited in claim 29, wherein computer-executable instructions that, when executed, cause the chassis to receive an address request for a network address comprise computer-executable instructions that, when executed, cause the chassis to receive a probe message.

33. The method as recited in claim 29, wherein computer-executable instructions that, when executed, cause the chassis to return a corresponding network address in response to the address request comprise computer-executable instructions that, when executed, cause the chassis to return an IP address.

34. The method as recited in claim 29, wherein computer-executable instructions that, when executed, cause the chassis to return a corresponding network address in response to the address request comprise computer-executable instructions that, when executed, cause the chassis to return one or more IP addresses for other chassis in the same subnet as the chassis.

35. The method as recited in claim 29, wherein computer-executable instructions that, when executed, cause the chassis to return a corresponding network address in response to the address request comprise computer-executable instructions that, when executed, cause a proxy chassis to return a corresponding network address.

36. The method as recited in claim 29, wherein computer-executable instructions that, when executed, cause the chassis to receive a resource data request for resource data representing the current configuration of the chassis comprise computer-executable instructions that, when executed, cause the chassis to receive a request for resource data representing the configuration of blades and ports at the chassis.

37. The method as recited in claim 29, wherein computer-executable instructions that, when executed, cause the chassis to return resource data representing the current configuration of the chassis comprise computer-executable instructions that, when executed, cause the chassis to return resource data representing the current configuration of blades and ports at the chassis.

38. The computer program product as recited in claim 29, further comprising computer-executable instructions that, when executed, cause the chassis to perform the following:

receive a further resource data request for resource data representing the current configuration of the chassis; and return resource data representing the current configuration of the chassis to the requesting computer system in response to the further resource data request.

* * * * *